(12) United States Patent
Yoshida

(10) Patent No.: US 6,324,022 B1
(45) Date of Patent: Nov. 27, 2001

(54) LENS BARREL

(75) Inventor: Shigeru Yoshida, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/535,967

(22) Filed: Mar. 27, 2000

(30) Foreign Application Priority Data

Mar. 29, 1999 (JP) .................................................. 11-086725

(51) Int. Cl.[7] .............................. G02B 7/02; G02B 15/14
(52) U.S. Cl. ........................... 359/823; 359/704; 359/700
(58) Field of Search .................................. 359/699, 700, 359/703, 704, 823, 701

(56) References Cited

U.S. PATENT DOCUMENTS

| | | | |
|---|---|---|---|
| 5,285,322 | * 2/1994 | Horning et al. | 359/826 |
| 6,108,146 | * 8/2000 | Kenin et al. | 359/822 |
| 6,160,670 | * 12/2000 | Nakayama et al. | 359/696 |
| 6,163,412 | * 12/2000 | Onda | 359/696 |
| 6,195,211 | * 2/2001 | Iwasaki | 359/694 |

* cited by examiner

*Primary Examiner*—Ricky Mack
(74) *Attorney, Agent, or Firm*—Young & Thompson

(57) ABSTRACT

A lens barrel having inner and outer cam rings which are configured to rotate relatively each other so as to shift one or more lens element of a lens system installed therein is equipped with an axial movement restraint mechanism for restraining axial play of one of the two cylindrical barrels relative to the other of the two cylindrical barrels while allowing relative rotation between them, the axial movement restraint mechanism comprising a radial jaw or a radial flange formed integrally with one of the inner and outer cam rings and a peripheral groove formed on another cam ring for receiving the jaw or the flanges and, if necessary, a spring disposed between the inner and outer cam rings for forcing the inner and outer cam rings in opposite axial directions, respectively.

7 Claims, 2 Drawing Sheets

LENS BARREL

BACKGROUND OF THE INVENTION

1. Field of the Invention

The present invention relates to a lens barrel, and in particular, to a lens barrel having a rotatable cylindrical ring with a curvilinear cam groove or slot and a stationary cylindrical ring with a linear cam groove or slot which are arranged coaxially with each other and a lens holder with a cam follower pin in engagement with both curvilinear cam groove and linear cam groove so as to move linearly along the linear grooved cam following movement of the curvilinear grooved cam when rotating either one of the rotatable cylindrical rings relative to the other.

2. Description of the Related Art

Typically, there are numerous lens barrel s that drive optical lens elements, such as a zooming lens element and a focusing lens element, by an manually operated ring or a motor driven ring. Such a lens barrel comprises at least a cylindrical ring with a linear cam groove or slot (which is referred to as a cylindrical linear cam ring) in which lens holders holding focusing lens elements or zooming lens elements is installed and a cylindrical ring with a curvilinear cam groove or slot (which is referred to as a cylindrical curvilinear cam ring) that is fitted externally on and coaxialy with the inner cylindrical ring. These cylindrical cam rings are configured such that either one of the cylindrical cam rings rotates relatively to the other. The lens holder is provided with a cam follower pin which extends radially into the curvilinear cam groove of the cylindrical curvilinear cam ring passing through the linear cam slot of the cylindrical linear cam ring. The lens barrel thus constructed moves the lens holders in an axial direction following rotation of either the cylindrical linear cam ring or the cylindrical curvilinear cam ring.

The this type of lens barrel restricts these cylindrical cam rings in axial position relative to a stationary cylindrical ring of the lens barrel by means of a restrictive ring or a restrictive plate while allowing them to rotate about the optical axis. This construction of the lens barrel has a drawback in an increase in cost that is induced by a large number of parts and an increased man-hour for assembling the lens barrel.

SUMMARY OF THE INVENTION

It is an object of the present invention to provide an optical scanning device which is accurate in scanning operation.

It is another object of the present invention to provide a lens barrel which provide a reduction in the number of parts and man-hour for assembly with an effect of reducing production costs.

The foregoing objects of the present invention are accomplished by a lens barrel that comprises an inner cam barrel, an outer cam barrel disposed coaxially with the inner cam barrel so as to be rotatable relatively to the inner cam barrel, a lens holder for holding a lens element of the optical lens system which has a radial cam follower pin which passes through an inner cam slot of the inner cam barrel and is received in an outer cam slot of the outer cam barrel and is shiftable alongside both inner and outer cam slots in an axial direction following relative rotation between the inner and outer cam barrels so as thereby to cause axial movement of the lens element for adjusting optical operating condition of the optical lens system, and axial movement restraint means for restraining the inner and outer cam barrels from axially moving relatively to each other during relative rotation between the inner and outer cam barrels. The axial movement restraint means comprises a peripheral groove which is formed on either one of the inner and outer cam barrels and a radial jaw which is formed on the other one of the inner and outer cam barrels and received in the peripheral groove for contact slide movement. The axial movement restraint means further comprises elastic means disposed between the inner and outer cam barrels for forcing the inner and outer cam barrels in opposite axial directions so as thereby to press the axial jaw against a wall of the peripheral groove.

Because of the simple structure of the axial movement restraint means which is formed by the jaw and the groove only and, if necessary, the elastic member incorporated between the cam barrels which eliminates axial play usually occurring between the cam barrels, while the number of parts necessary for the lens barrel is reduced and, in consequence, man-hour necessary for assembling the lens barrel is considerably cut, which are always desirable for cutting production costs of the lens barrel, the lens barrel is precise in operation, as compared with conventional lens barrels.

BRIEF DESCRIPTION OF THE DRAWINGS

The above and other objects and features of the present invention will be more apparent from the following detailed description in connection with a preferred embodiment thereof when reading in conjunction with the accompanying drawings, in which.

DETAILED DESCRIPTION OF THE INVENTION

Figure 1:
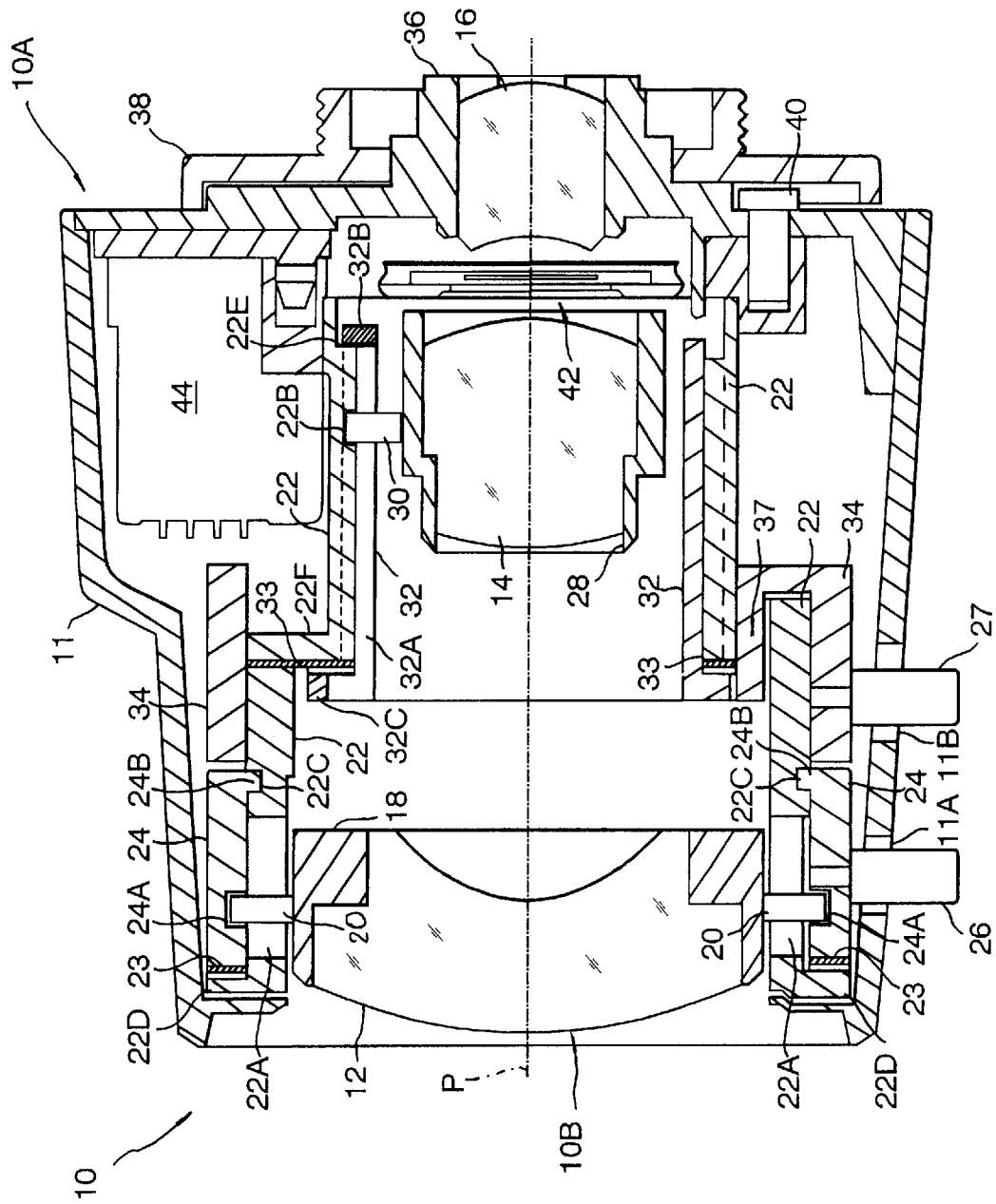
FIG. 1 is a cross-sectional view of a varifocal lens barrel in accordance with a preferred embodiment of the present invention.
Figure 2:
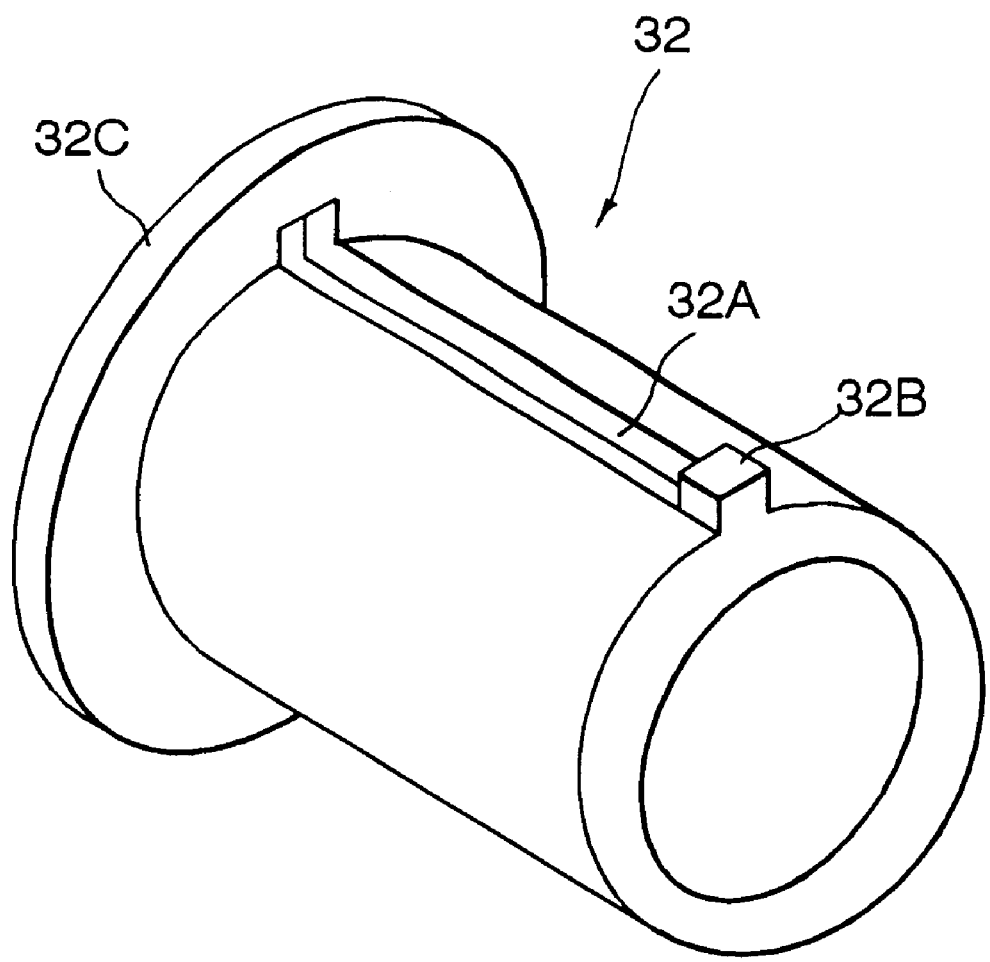
FIG. 2 is a perspective view showing an outer appearance of a linear cam ring of the varifocal lens barrel of FIG. 1.

Referring to the drawings in detail, and in particular to FIG. 1 showing of a lens barrel with a varifocal lens system installed therein in accordance with a preferred embodiment of the present invention, a varifocal lens 10 comprises a lens barrel 10A and a varifocal lens system 10B installed in the lens barrel 10A. The varifocal lens system 10A comprises a focusing lens element 12, a zooming lens element 14 and a master lens element 16 arranged in order from an object end along an optical axis P. The lens barrel 10A has a stationary cylindrical barrel 22, namely a stationary cam ring which is formed by two integral parts, i.e. a larger diameter front part and a smaller diameter rear part, a rotatable cylindrical barrel 24, namely a focusing cam ring, which is externally fitted onto the larger diameter front part of the stationary cam ring 22 for rotation relative to the stationary cam ring 22, a rotatable cylindrical barrel 34, namely a zooming ring, which is externally fitted onto the larger diameter front part of the stationary cam ring 22 for rotation relative to the stationary cam ring 22, a rotatable cylindrical barrel 32, namely a zooming cam ring, which is internally fitted into the smaller diameter rear part of the stationary cam ring 22 for rotation relative to the stationary cam ring 22, The focusing cam ring 24 is arranged coaxially with and in front of the zooming ring 34 in the axial direction P and operationally linked to the zooming ring 34 by means of a linking mechanism (not shown) so as to keep the varifocal lens system 10B remaining focused on an object. Such a linking mechanism is known in various forms in the art and may take any well known form. The stationary cam ring 22 is formed with a plurality of linear cam slots 22A (only two linear cam slots are shown in FIG. 1) formed and arranged at regular angular intervals in the larger diameter front part thereof and extend in the axial direction P, a plurality of internal curvilinear cam grooves 22B (only one curvilinear cam groove is shown in FIG. 1) formed in the smaller diameter part thereof, an external peripheral groove 22C formed in the larger diameter front part thereof, a flange 22D extending radially outward from the front end thereof, and an annular shoulder 22E formed at the rear end thereof.

The focusing cam ring 24 is formed with a plurality of internal curvilinear cam grooves 24A (only two linear cam grooves are shown in FIG. 1) arranged at regular angular intervals so as to spatially intersect the linear cam slots 22A of the stationary cam ring 22, respectively, and has a rear annular flange 24B extending radially inward. The zooming cam ring 32 is formed with a linear cam slot 32A which extends along the entire length of the zooming cam ring 32 in the axial direction P and has a front annular flange 32C extending radially outward to a vertical connecting wall 22F between the larger and smaller diameter parts of the stationary cam ring 22 and a rear contact jaw 32B extending radially outward so as to be received by the annular shoulder 22E of the stationary cam ring 22. These front annular flange 32C and the rear contact jaw 32B are preferably formed integrally with the zooming cam ring 32 and, however, may be separately made and secured to the zooming ring.

A moveable annular lens holder 18 which the focusing lens element 12 fixedly holds therein is provided with a plurality of cam follower pins 20 (only two cam follower pins are shown in FIG. 1) which radially extend and is installed within the large diameter front part of the stationary cam ring 22 with the cam follower pins 20 passing through the linear cam slots 22A of the stationary cam ring 22, respectively, and received in the curvilinear cam grooves 24A of the focusing cam ring 24, respectively. A moveable annular lens holder 28 which fixedly holds the zooming lens element 14 therein is provided with a plurality of cam follower pins 30 (only one can follower pin is shown in FIG. 1) which radially extends and is installed within the zooming cam ring 32 with the cam follower pins 30 passing through the linear cam slot 32A of the zooming cam ring 32 and received in the internal curvilinear cam grooves 22B of the stationary cam ring 22. A stationary lens holder 36 which holds the master lens 16 is fixedly put between a mounting ring 38 by which the varifocal lens 10 is detachably mounted to a camera (not shown) and a stationary part 40 of the lens cylindrical ring 10A where an iris diaphragm 42 is installed. This iris diaphragm 42 is driven by a built-in electric motor 44.

The focusing cam ring 24 is fitted onto the stationary cam ring 22 with the rear annular flange 24B in slide engagement with the peripheral groove 22C, so that it is allowed to rotate with respect to the stationary cam ring 22 but kept from axial movement. A corrugated ring spring 23 is put between an top end of the focusing cam ring 24 and the radial flange 22D of the stationary cam ring 22 so as to force the focusing cam ring 24 rearward and in consequence press the rear annular flange 24B against a rear wall of the peripheral groove 22C of the stationary cam ring 22 with an effect of eliminating axial play of the focusing cam ring 24 and being conducive to smooth rotation of the focusing cam ring 24 to a nicety. Selection of the spring constant of the corrugated ring spring 23 provides appropriate rotational torque of the focusing cam ring 24. The focusing cam ring 24 is provided with an operating lever (focusing lever) 26 extending radially outward passing through a peripheral slot 11A for external access. When turning the focusing cam ring 24 by pushing sideways the operating lever 26 in one of opposite directions, the focusing cam ring 24 forces the cam follower pins 20 of the lens holder 18 received in the curvilinear cam grooves 24A, so that the cam follower pins 20 of the lens holder 18 is shifted forward or rearward in the linear cam slot 22A of the stationary cam ring 22 following the curvilinear cam grooves 24A according angles of rotation of the focusing cam ring 24. As a result, the focusing lens element 12 is shifted along the optical axis P for focusing the varifocal lens system 10B on a desired object.

The zooming ring 34 is integrally formed with a connecting ring 37 extending forward partly from the rear end thereof. Through the connecting ring the zooming ring 34 is operationally linked to the zooming cam ring 32. The zooming ring 34 is provided with an operating lever (zooming lever) 27 extending radially outward passing through a peripheral slot 11B for external access. When turning the zooming ring 34 by pushing sideways the operating lever 27 in one of opposite directions, the zooming ring 24 forces the zooming cam ring 32, so as to force the cam follower pins 30 of the lens holder 28 to turn about the optical axis P and shift in the axial direction P following the curvilinear cam grooves 22B of the stationary cam ring 22 according angles of rotation of the zooming ring 34. As a result, the zooming lens element 14 is shifted along the optical axis P for adjusting the focal length of the varifocal lens system 10B. As was previously described, the focusing cam ring 24 is operationally linked to the zooming ring 34 through the linking mechanism which causes rotation of the focusing cam ring 24 accompanying rotation of the zooming ring 34 such that the focusing lens 12 is shifted relatively to the axially moving zooming lens 14 so as to keep the varifocal lens system 10B remaining focused on an object even during adjusting the focal length of the varifocal lens system 10B.

The zooming cam ring 32 is fitted in the stationary cam ring 22 by holding the smaller diameter rear part of the stationary cam ring 22 32B in the axial direction between the front annular flange 32C and the rear contact jaw 32B. A corrugated ring spring 33 is put between the front annular flange 32C of the zooming cam ring 32 and the vertical connecting wall 22F of the stationary cam ring 22 so as to force the zooming cam ring 32 forward and in consequence press the rear contact jaw 32B against a front wall of the annular shoulder 22E of the stationary cam ring 22 with an effect of eliminating axial play of the zooming cam ring 32 and being conducive to smooth rotation of the zooming cam ring 32 to a nicety. Selection of the spring constant of the corrugated ring spring 33 provides appropriate rotational torque of the zooming ring 34. In this instance, in order to allow the rear contact jaw 32B of the zooming cam ring 32 to pass through the interior of the stationary cam ring 22, the linear cam slot 32A extends from end to end of the zooming cam ring 32.

In operation of the varifocal lens 10 thus constructed, when operating the zooming level 27 sideways to turn the zooming ring 34 in one of opposite directions, the zooming cam ring 34 is turned in the same direction with the rear contact jaw 32B thereof keeping sliding contact with the annular shoulder 22E of the stationary cam ring 22. This contact slide between the contact jaw 32B and the annular shoulder 22E, which works as axial movement restraint means, eliminates the necessity of using a pressure member such as a brace ring for restraining axial play of the zooming cam ring 32 and keeping it in a given axial position relative to the stationary cam ring 22. Moreover the zooming cam ring 32 is rotated with the contact jaw 32B pressed against the wall of the shoulder 22E by means of the corrugated ring spring 33 put between the stationary cam ring 22 and the zooming cam ring 32, so as to keep the zooming cam ring 32 from rotation accompanied by axial play. On the other hand, when operating the focusing lever 26 sideways, the focusing cam ring 24 is turned with the rear annular flange 24B remaining in engagement with the external peripheral groove 22C of the stationary cam ring 22. This engagement between the rear annular flange 24B and the external peripheral groove 22C, which works as axial play restraint means, eliminates the necessity of using a pressure member such as a brace ring for restraining axial play of the focusing cam ring 24 and keeping it in a given axial position relative to the stationary cam ring 22. Moreover the focusing cam ring 24 is rotated with the rear annular flange 24B pressed against the rear wall of the external periphery groove 22C by means of the corrugated ring spring 23 put between the stationary cam ring 22 and the focusing cam ring 24, so as to keep the focusing cam ring 24 from rotation accompanied by axial play.

In the lens barrel 10A described above, the focusing cam ring 24 may be placed inside the stationary cam ring 22. Further, the rear annular flange 24B of the focusing cam ring 24 and the external periphery groove 22C of the stationary cam ring may be replaced with each other. Further, the axial play restraint means may be provided in either one of the focusing cam ring and the zooming cam ring. The corrugated ring spring 23 or 33 may be replaced with any type of spring that forces the focusing cam ring 24 or the zooming cam ring 32 in the axial direction.

Although the present invention has been described in connection with the lens barrel 10A of the varifocal lens 10 which remains focused on an object even during adjusting the focal length thereof, it is applicable to lens barrels which comprises at least two cam rings for shifting lens component of a lens system installed in the lens barrel.

It is to be understood that although the present invention has been fully described by way of the preferred embodiments thereof with reference to the accompanying drawings, various variant and other embodiments may occur to those skilled in the art. Unless these variants and embodiment depart from the scope of the present invention, they are intended to be covered by the following claims.

What is claimed is:

1. A lens barrel for causing relative axial movement of lens elements of an optical lens system to adjust optical operating conditions of the optical lens system, said lens barrel comprising:

an inner barrel formed with an inner cam slot;

an outer barrel disposed coaxially with said inner barrel so as to rotate relatively to said inner barrel and formed with an outer cam slot which spatially intersects said inner cam slot;

a lens holder for holding a lens element of the optical lens system; said lens holder having a radial cam follower pin which passes through said inner cam slot of said inner barrel and is received in said outer cam slot of said outer barrel so as to shift said lens holder alongside both said inner and outer cam slots in an axial direction following relative rotation between said inner and outer barrels so as to cause axial movement of said lens element, thereby adjusting optical operating condition of the optical lens system; and axial movement restraint means for restraining said inner and outer barrels from axially moving relatively to each other during relative rotation between said inner and outer barrels;

wherein said axial movement restraint means comprises a peripheral groove which is formed on one of said inner and outer barrels and a radial jaw which is formed on another of said inner and outer barrels and received for contact slide movement in said peripheral groove.

2. A lens barrel as defined in claim 1, wherein said axial movement restraint means further comprises elastic means disposed between said inner and outer barrels for forcing said inner and outer barrels in opposite axial directions, respectively, so as thereby to press said axial jaw against a wall of said peripheral groove.

3. A lens barrel as defined in claim 2, wherein said peripheral groove is formed as an annular shoulder at one end of axially opposite ends of said one barrel and said radial jaw is formed at one end of axially opposite ends of said another barrel.

4. A lens barrel as defined in claim 3, wherein said elastic means is disposed between another ends of said inner and outer barrels.

5. A lens barrel as defined in claim 3, wherein said elastic means comprises a corrugated leaf spring.

6. A lens barrel as defined in claim 2, wherein one of said inner and outer barrels is stationary in both circumferential and axial directions and another of said inner and outer barrels is rotatable.

7. A lens barrel as defined in claim 6, wherein one of said inner and outer cam slots comprises a linear cam slot extending in said axial direction and another of said inner and outer cam slots comprises a curvilinear cal slot that spatially intersects said linear cal slot.

* * * * *